March 22, 1949.  J. F. BOYLE  2,465,193
PNEUMATIC LANDING GEAR FOR HELICOPTERS
AND LIKE AIRCRAFT
Filed Dec. 28, 1944  2 Sheets-Sheet 1
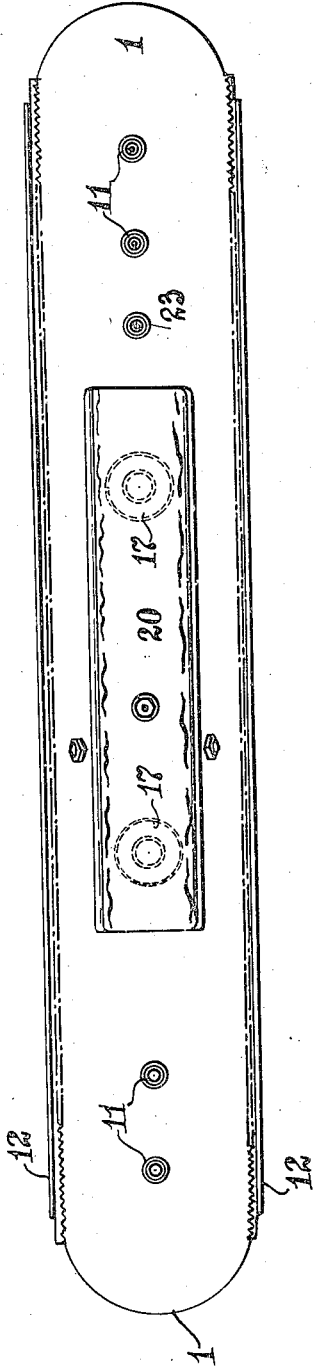
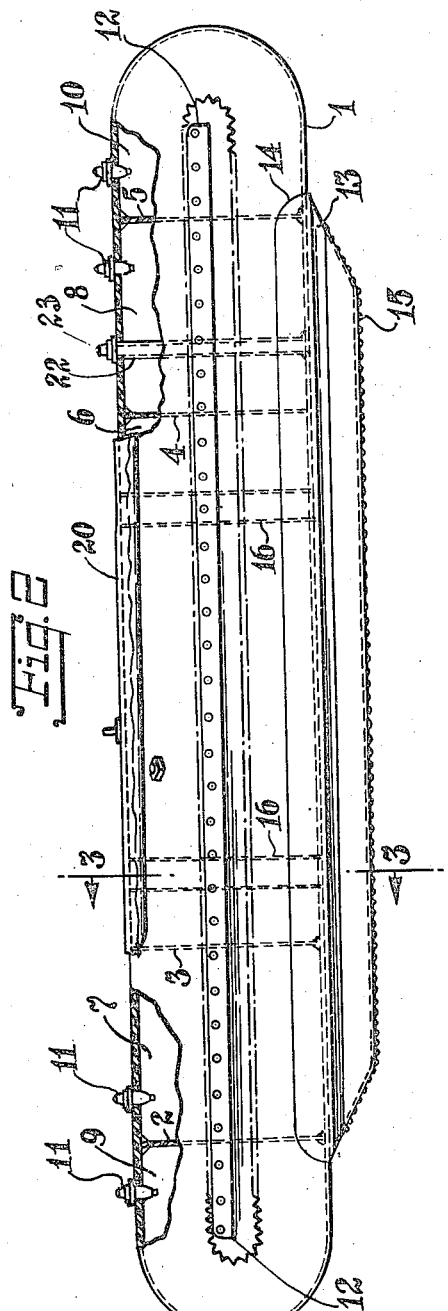
INVENTOR.
James F. Boyle
BY
Joseph F. O'Brien
Attorney March 22, 1949.  J. F. BOYLE  2,465,193
PNEUMATIC LANDING GEAR FOR HELICOPTERS
AND LIKE AIRCRAFT
Filed Dec. 28, 1944  2 Sheets-Sheet 2
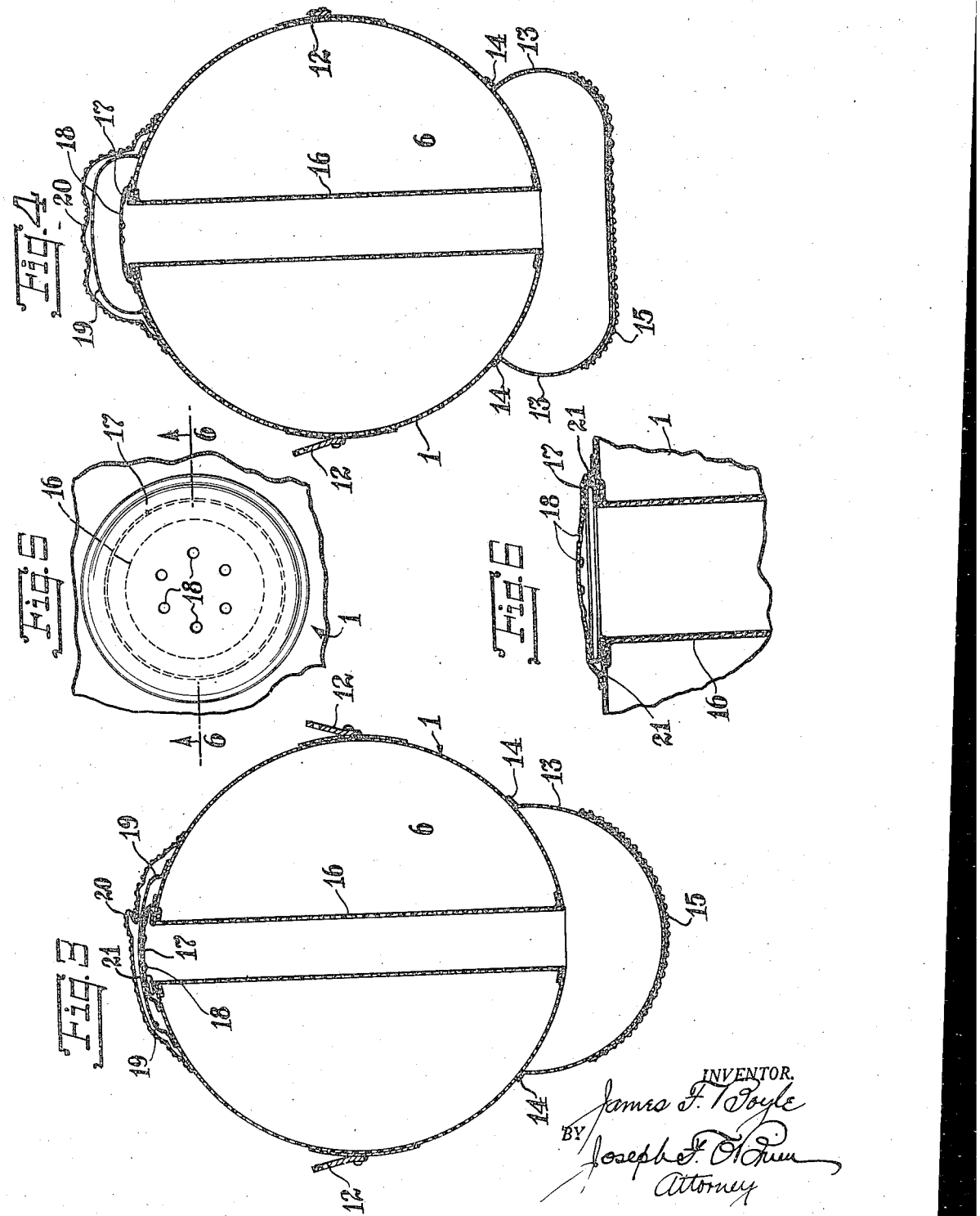
INVENTOR.
James F. Boyle
BY
Joseph F. O'Brien
Attorney Patented Mar. 22, 1949

2,465,193

UNITED STATES PATENT OFFICE 2,465,193

PNEUMATIC LANDING GEAR FOR HELICOPTERS AND LIKE AIRCRAFT

James F. Boyle, Teaneck, N. J., assignor to Air Cruisers, Inc., Clifton, N. J.

Application December 28, 1944, Serial No. 570,130

8 Claims. (Cl. 244—105)

This invention relates to improvements in pneumatic landing gear for helicopters and like aircraft.

Heretofore simple or single cylindrical landing floats for aircraft have been built and applied to the aircraft to enable the same to land on water. Such prior art floats were divided into compartments and had sufficient buoyancy to successfully float a helicopter on water, but when such floats were inflated to such extent or rigidity that they would not be crushed into flattened condition when used as a landing device to permit a helicopter to be set down on land, it was found that a violent vibration of the entire ship was set up by the down draft of the rotor. In other words, when a helicopter is caused to land and rest on ordinary high-pressure cylindrical floats which contact the ground, the blast of air against the ground from the revolving rotor causes the helicopter to vibrate or "dance" so violently that the rotor has to be shut down to eliminate the same. This vibration is sometimes technically referred to in the trade as "ground resonance."

It was found that this vibration could be absorbed and dampened out if the helicopter were equipped with wheels mounted on oleo struts, which absorb or dampen out such vibration. Such wheel construction, however, cannot be used for landing on water, and a problem was presented to design a helicopter landing-gear which would allow a ship to land and rest on water without sinking and also to permit landings on the ground or on the deck of a ship without the aforesaid violent vibration of the entire aircraft.

Through experimentation it was found by applicant that when the inflation of the ordinary cylindrical floats, as hereinabove referred to, was reduced by lowering the pressure to almost atmospheric pressure, the aforesaid vibration might be avoided or stopped when the ship rested on land or on a ship's deck, but this expedient was impractical because such soft floats would, when the aircraft took to the air, be too flabby and would flap in the wind. To solve this problem of amphibious landings, applicant designed the landing gear of the instant application which not only will not become flabby in flight but will absorb and dampen the aforesaid landing vibrations or "ground resonance" when the ship is caused to land on the ground or on a ship's deck and at the same time will enable the ship to land on water and serve as a buoyant float therefor. To this end, I utilize a relatively high-pressure pneumatic-container which is inflated at sufficiently high pressure to be hard and rigid so as to enable functioning as a non-flabby float for the helicopter and also to serve as a resilient mounting member or carrier for a low pressure shock-absorbing pneumatic container of soft or pliable characteristics adapted to function as a contact member upon the landing of the helicopter either on a ship's deck, on land or on water and particularly to function as a soft and pliable vibration-absorbing and dampening element when the helicopter is brought down upon a ship's deck or upon the ground and which upon such ship's deck or ground landing of the aircraft will receive, absorb and compensate for the shocks of varying magnitude met during such a landing operation.

Another object of my invention is to provide a landing gear construction in which the contact member will function similarly to a door-check. In other words, shocks will be taken up by an immediate or instantaneous passage of air from the contact member to a subsidiary bleeder-container connected therewith, and this air will be slowly passed back to the said contact container by the resilience or elastic qualities of the diaphragm to cause said container to resume substantially normal pressure and to avoid any flabbiness thereof.

Another object of my invention is to utilize in a device of the character specified a diaphragm between the contact member and the bleeder-compartment of such elastic strength that when the ship is landed on the ground, it will permit the contact member to be substantially flattened out to take up shocks and vibration but will prevent excessive passage of air from the contact compartment into the bleeder-compartment so that a soft air cushion will be provided and said diaphragm, when the ship definitely comes to rest, will slowly force the air in the bleeder container back into the contact container, thus permitting the aircraft not only to rest on a soft contact container but to eliminate the aforesaid vibration or ground resonance or "dancing" caused by the down blast from the rotor.

Another object of the invention is to limit the amount of air that may pass from the contact container into the diaphragm-controlled bleeder container so that if and when a hard landing is made that would result in an extra hard bump so that substantially all the air in the contact container would be forced into the bleeder compartment, the expanding movement of the controlling diaphragm is limited by enclosing or covering the same in a fabric envelope which prevents excessive outward movement and limits the expansion of the diaphragm to the limits of the fabric envelope. Upon the removal of the shocks and stress, the air then returns slowly, in the manner hereinabove described, to the contact container which would be inflated again to substantially normal pressure and in either condition functions to stop any vibration or "dancing" of the ship.

Another object of my invention is to produce a pneumatic landing gear of the type specified comprising a plurality of pneumatic containers, one of which is inflated to a relatively high pressure to provide relatively hard and rigid characteristics and to function as a buoyant float as well as a carrier member, and another of which is inflated to low-pressure to provide relatively soft and pliant characteristics so as to function as a contact member and shock-absorbing element that will take up shocks incident to landing and also eliminate the vibrations caused by the downdraft of the rotor hereinabove referred to.

Another object of my invention is to provide in a device of the character specified an automatically-actuated air or gas-pressure controlling means adapted under conditions of stress or shock of landing to quickly relieve gas from the contact container member and thereafter slowly to return such gas to the said contact container member comprising a diaphragm-controlled bleeder container having an operative connection with said low pressure container.

Still another object of my invention is to produce a pneumatic landing gear of the type specified comprising a combined pneumatic float and carrier of relatively high pressure with the rigid characteristics hereinabove specified in combination with a pneumatic ground-contact member of relatively low pressure with the soft characteristics specified, and automatically-actuated gas-pressure controlling means for displacing or relieving part of the gas from said low pressure container when said container is placed under high external shocks or stress due to a deck or ground landing of an aircraft and a subsequent slow returning of such gas when such shocks or stresses have subsided.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in plan of a pneumatic landing gear for helicopters and like aircraft embodying my invention;

Fig. 2 is a view in side elevation having parts broken away of the landing gear shown in Fig. 1;

Fig. 3 is a sectional view on the line 3—3 of Fig. 2 looking in the direction of the arrows and illustrating the landing gear in inoperative condition;

Fig. 4 is a sectional view similar to Fig. 3 showing the landing gear while absorbing shocks in a landing operation;

Fig. 5 is a top plan view of a bleeder disc shown in section in Figs. 3 and 4; and Fig. 6 is an enlarged section on the line 6—6 of Fig. 5 looking in the direction of the arrows.

Referring now to these drawings, which illustrate a preferred embodiment of my invention, the drawings illustrate a pneumatic landing-gear for helicopters and other types of aircraft which is carried beneath such aircraft to contact the ground on landing and comprises, in the preferred form shown, a pneumatic high-pressure shock and vibration-absorbing carrier member 1 composed of a float-like pneumatic elongated cylinder with rounded closed ends. This float-like cylindrical carrier member is preferably composed of rubberized fabric or other suitable fabric, natural or synthetic, which is capable of maintaining air pressure and is divided by a series of transverse bulkheads 2, 3, 4 and 5 into a middle compartment 6, intermediate compartments 7 and 8 and end compartments 9 and 10, respectively, and suitable valves 11 are provided in the wall of each compartment to permit the inflation thereof. As shown, said pneumatic cylindrical member 1 is provided at opposite sides with suspension girts 12 by which the device is attached to or suspended from a helicopter or other aircraft in position to function primarily as a landing float to enable such craft to land on water and as a carrier member for a low-pressure contact member operable during a deck or ground landing operation of the helicopter or like aircraft to absorb landing shocks and vibrations and also to dampen out and eliminate violent vibrations caused by the down draft or blast of air from the revolving rotor which often cause the ship to "dance" to such an extent as to compel the rotor to be shut down. These vibrations are known in the trade as "ground resonance."

The carrier and shock-absorbing element above described is inflated with a suitable gas to a relatively high pressure. Preferably said carrier shock-absorbing member is inflated to a pressure of approximately two pounds per square inch and has substantial rigidity, but will still have sufficient resilience and flexibility to absorb such part of the shock and vibrations received in a landing of a helicopter or like aircraft as are not absorbed or completely cushioned by a ground-contact member hereinafter specified. In the instant device this carrier-shock-absorbing member is utilized as a float when a landing is effected on water and also as a mounting for a low-pressure contact and shock-absorbing member which comprises a pneumatic container mounted on and carried by the aforesaid carrier member and adapted upon a ground or deck landing to contact the ground and to receive the first and primary shock of landing, as well as to eliminate the aforesaid "ground resonance."

In the preferred embodiment of my invention shown, the said low-presure ground-contacting and shock-absorbing container is connected as a so-called "blister" to the bottom or belly of the said high-pressure container in position to function as a contact member, whether landing is effected on the ground, on the deck of a ship or on water. As illustrated, the said low pressure compartment is an inflatable pneumatic container formed by providing and fastening to the bottom portion of the member 1 a subsidiary container-envelope 13 which is secured at 14 to the outer surface of the bottom of said member 1 as a so-called "blister." Said container 13 is provided at its bottom with a chafing strip or contact shoe 15 which is suitably secured thereto as, for example, by rubber cement and extends across the longitudinal middle portion of the envelope 13 and for a considerable distance on opposite sides thereof but leaves the upper portion free and consequently more resilient for a purpose hereinafter specified.

The low pressure ground-contacting container is preferably inflated with a suitable gas, such as air, to a pressure of one-half pound per square inch so as to have relatively soft and pliant characteristics and yet to have sufficient stability as not to flap in the wind when the aircraft takes to the air, and this low pressure container is preferably made further resilient and shock-absorbing by automatically-operable gas-bleeder means preferably comprising an operative connection with a diaphragm-controlled gas-bleeder container also preferably carried by the carrier container 1, and connection is made through a connecting passage or passages preferably extending through the carrier member 1.

The air bleeder container is preferably so connected with the low-pressure shock-absorber container through chimneys 16, each of which is closed at its upper end by a gas-retentive diaphragm 19 of latex or other suitable material having sufficient strength to enable, under inactive conditions, as, for example, when a ship is in flight, the maintainence of said low-pressure in said low-pressure ground-contacting and shock-absorbing container, but under the stress produced in landing to expand within a suitable space provided therefor. As illustrated, the diaphragm 19 is supported by a relatively rigid circular disc 17 provided with a plurality and preferably six gas-bleeding holes 18. I thus provide a bleeder container or compartment adapted quickly to receive a considerable part of the air contained in said low-pressure ground contacting container when the latter is subjected to the shocks and stress of landing on ground or on the deck of a vessel. This bleeder compartment is preferably positioned along the top surface of the carrier member 1, and it will be understood that when a shock or stress is encountered on the ground contacting container that overbalances the elastic strength of the diaphragm, said diaphragm will be quickly expanded to produce the aforesaid bleeder-compartment, thus permitting the said low-pressure ground-contacting container to be pressed by the shocks and stress of landing into almost flattened condition and that when such shocks and stress are wholly or partly removed the elastic qualities and strength of the diaphragm will slowly force the air back again to said low pressure ground-contacting container. For example, when the shocks encountered in landing subside, the diaphragm will slowly force air back into the said ground-contacting container till a balanced condition is produced and when the entire stress is removed, due to the aicraft taking to the air, then the diaphragm will force all the air in the bleeder compartment back into the ground-contacting compartment to prevent the same from being flabby or to flap in the wind while the aircraft is in flight and also to provide proper and normal conditions for another landing.

The expanding movement of said diaphragm is limited by an envelope 20 composed of canvas or other suitable flexible fabric adapted to remain in a collapsed condition on top of the diaphragm, but under conditions of landing stress, to have a movement with the expanding movement of the latex diaphragm 19, but to limit such expanding movement so as to avoid undue or excessive expansion thereof. I thus provide a gas-bleeder container adapted, during the stress of landing, to receive a substantial part of the gas therefrom and consequently to cause said low-pressure container to be more resilient and flexible than would be otherwise possible. The air bleeder disc 17 is preferably mounted at the top of the chimney 16 in position to itself have a certain degree of resilience and, as illustrated, a collar 21 of suitable tape, such as one inch crotch tape, forms a more or less resilient hinge structure that will sustain the first impinging shock of gas striking the under surface thereof and passing through the holes thereof to expand the latex diaphragm and thereafter pass into the bleeder container formed between the top of the container 1 and said diaphragm and limited by said envelope 20. As illustrated, this collar 21 is U-shaped in configuration with the open portion extending toward the axis of the chimney.

In operation, when a landing gear of the character specified is suspended from a helicopter or like aircraft, the chafing strip or shoe portion of the low pressure shock-absorber chamber will contact the ground or other surface on landing of such aircraft and the incident shocks of landing will be taken up by the highly-resilient low-pressure ground-contacting container, the outer wall or envelope of which will be flattened, as shown in Fig. 4. Upon such flattening shocks, the gas within said low-pressure shock-absorber chamber will be somewhat compressed and a considerable portion of the same will be quickly and immediately passed through the chimneys 16 and through the holes 18 in the bleeder disc 17 to expand the latex diaphragm 19 to the necessary degree within the limits of the envelope covering said latex diaphragm. This arrangement thus forms a highly resilient structure which absorbs the large and sudden shocks of landing and also the vibration caused by the down-draft of the propeller of a helicopter hereinabove referred to. Also, because of the fact that this low-pressure highly resilient container is carried and supported by a high-pressure pneumatic container composed of a series of compartments in the member 1 a float for landing on water is produced that is more efficient than would be otherwise possible and when used as a landing gear for landing on the deck of a ship or on ground, a high efficiency landing gear is provided by which all shocks and vibrations including subsidiary shocks incident to the primary landing shock will be absorbed. The absorbing and floating qualities of both the high-pressure and low-pressure containers are thus utilized and combined to provide a highly resilient and efficient shock-absorbing device or gear for amphibious landings of an aircraft and particularly of a helicopter that will be light and durable and will have the other stable flying qualities above specified.

In the embodiment illustrated, the low pressure shock-absorber container is provided with an inflation chimney 22 extending diametrically through the carrier 1 and having at its upper end a mattress-valve 23 for inflation of the low-pressure chamber from the top of the high-pressure chamber 1.

In the embodiment illustrated, the chimneys or passageways 16 are preferably composed of a rubberized or other suitable fabric, natural or synthetic, and are preferably wound with wire to make them non-collapsible so as to prevent the relatively high pressure in the main float from collapsing such chimneys or passageways and thus shutting off the passage of gas or air therethrough.

The word "gas" herein is intended to include "air" and other gas-mixtures and the word "ground" is intended to include "deck" or similar landing surface.

Having described my invention, I claim:

1. A pneumatic landing gear for helicopters and like aircraft embodying, in combination, a carrier-member comprising a relatively rigid shock-absorbing element, means for connecting said carrier-member to an aircraft, and a ground-contact member comprising a pneumatic container of a given degree of pressure resistance inflated with gas and disposed below said relatively rigid carrier in position to contact the ground or deck upon landing of the aircraft, a pneumatic bleeder-container of lesser pressure resistance connected with said low-pressure container and provided with automatically expansible and contractible means for causing displacement of gas from said ground-contact member to said bleeder container to provide compensating resilience for said low-pressure shock-absorbing ground-contact member in proportion to the shocks and vibrations encountered in a landing operation, and for automatically returning said displaced gas upon the release of the pressure encountered in said landing operation.

2. A pneumatic landing gear for helicopters and like aircraft embodying, in combination, a carrier-member comprising a relatively rigid shock-absorbing element, means for connecting said carrier-member to an aircraft, and a ground-contact member comprising a pneumatic container of a given degree of pressure resistance inflated with gas to relatively low-pressure and disposed below said relatively rigid carrier in position to contact the ground upon landing of the aircraft, a pneumatic bleeder-container of lesser pressure resistance connected with said low-pressure container and provided with automatically expansible and contractible means for causing displacement of gas from said ground-contact member to said bleeder-container to provide compensating resilience for said low-pressure shock-absorbing ground-contact member in proportion to the shocks and vibrations encountered in a landing operation, and for automatically returning said displaced gas upon the release of the pressure encountered in said landing operation, said gas displacing means comprising a diaphragm automatically expansible to resiliently control passage of gas from said ground-contact member to said bleeder-container, and automatically contractible to return gas pressure to said ground contact member.

3. A pneumatic landing gear for helicopters and like aircraft embodying, in combination, a carrier-member comprising a relatively rigid shock-absorbing element, means for connecting said carrier-member to an aircraft, and a ground-contact member comprising a pneumatic container of a given degree of pressure resistance inflated with gas to relatively low-pressure and disposed below said relatively rigid carrier in position to contact the ground upon landing of the aircraft, a pneumatic bleeder-container connected with said low-pressure container and provided with automatically expansible and contractible means for causing displacement of gas from said ground-contact member to said bleeder-container to provide compensating resilience for said low-pressure shock-absorbing ground-contact member in proportion to the shocks and weight encountered in a landing operation, and for automatically returning said displaced gas upon the release of the pressure encountered in said landing operation, said gas displacing means comprising a diaphragm automatically expansible to resiliently control passage of air from said ground-contact member to said bleeder-container and a relatively rigid disc arranged between said ground-contact member and said diaphragm, and having relatively small gas-bleeder openings to control the passage of gas from said ground-contact member to the bleeder-container, said diaphragm also being adapted automatically upon the release of pressure to return gas from said pneumatic bleeder container to said ground contact member to provide sufficiently high pressure therein for the maintenance of stability in flight.

4. A pneumatic landing gear for helicopters and like aircraft embodying, in combination, a carrier-member comprising a relatively rigid shock-absorbing element, means for connecting said carrier-member to an aircraft, and a ground-contact member comprising a pneumatic container inflated with gas to relatively low-pressure and disposed below said relatively rigid carrier in position to contact the ground upon landing of the aircraft, a pneumatic bleeder-container connected with said low-pressure container and provided with means for controlling displacement of gas from said ground-contact member to said bleeder-container to provide compensating resilience for said low-pressure shock-absorbing ground-contact member in proportion to the shocks and weight encountered in a landing operation, said controlling means comprising an expansible diaphragm to control passage of air from said ground-contact member to said bleeder-container, a relatively rigid disc arranged between said ground-contact member and said diaphragm and having relatively small gas-bleeder openings to control the passage of gas from said ground-contact member to the bleeder-container and an envelope of flexible material disposed over said expansible diaphragm to limit the expansion movement thereof.

5. A shock-absorbing landing gear for helicopters and like aircraft embodying, in combination, a relatively rigid carrier member comprising a cylindrical relatively high-pressure inflated pneumatic container of float-like structure, a ground contact member disposed below said resilient carrier and comprising an inflated flap-like envelope fastened at its edges to the outer surface of the lower portion of said pneumatic float-like carrier member and a bleeder-container mounted at the top of said carrier member and non-collapsible passageways between said ground-contact member and said bleeder-container extending through said float-like carrier.

6. A pneumatic landing gear for helicopters and like aircraft embodying, in combination, a ground-contact member comprising a low-pressure pneumatic container of a given degree of pressure resistance, a gas-bleeder container of lesser pressure resistance connected with said low pressure ground contact container, an elastic diaphragm in said gas bleeder container, expansible to resiliently control the passage of air from the said low pressure pneumatic container to said gas bleeder container upon a deck-or-ground landing of the aircraft to partially relieve the gas pressure from said ground-contacting low-pressure container to further soften the same to absorb shocks incident to such landing operation and thereafter, contractible upon the relief of such shocks or stress, to forcibly, by the power of said diaphragm, to return air to the low-pressure ground-contacting container.

7. A pneumatic landing gear for helicopters and like aircraft embodying, in combination, a carrier-member comprising a relatively rigid shock-absorbing element, means for connecting said carrier-member to an aircraft, and a ground-contact member comprising an inflated pneumatic container of a given degree of pressure resistance and automatically expansible and contractible pneumatic container of lesser pressure resistance directly connected to said ground contact member to cause automatic variation both up and down of the pressure therein, whereby shocks encountered in landing and vibrations set up by the down-draft of a helicopter's propellor will be absorbed and dampened.

8. Alighting gear for direct lift aircraft in the form of a float adapted to support the aircraft upon solid surfaces and upon water comprising in combination, hollow structure for displacing water including a contractible chamber forming the bottom of the structure and adapted to contract when supporting the aircraft upon solid surfaces, an expansible chamber forming another part of the structure, and a restricted passage between said chambers for damping vibrations by restricting fluid flow between said chambers.

JAMES F. BOYLE.

REFERENCES CITED

The following references are of record in the file of this patent:

UNITED STATES PATENTS

| Number | Name | Date |
|---|---|---|
| 1,257,413 | Sloper | Feb. 26, 1918 |
| 1,579,183 | Weiland | Mar. 30, 1926 |
| 2,017,419 | Mercier | Oct. 15, 1935 |
| 2,101,399 | Larsen | Dec. 7, 1937 |
| 2,165,465 | Ehrhardt | July 11, 1939 |

FOREIGN PATENTS

| Number | Country | Date |
|---|---|---|
| 115,260 | France | Aug. 29, 1918 |
| 624,031 | Germany | Jan. 10, 1936 |